United States Patent
Yamamoto et al.

(10) Patent No.: US 7,206,031 B2
(45) Date of Patent: Apr. 17, 2007

(54) RECEIVER

(75) Inventors: Manabu Yamamoto, Osaka (JP);
Takahiro Katayama, Osaka (JP);
Kazuhiko Tani, Osaka (JP); Yusuke Nishida, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 612 days.

(21) Appl. No.: 10/153,108

(22) Filed: May 22, 2002

(65) Prior Publication Data
US 2002/0178449 A1 Nov. 28, 2002

(30) Foreign Application Priority Data
May 22, 2001 (JP) ............... P.2001-152621

(51) Int. Cl.
H04N 5/445 (2006.01)
G06F 3/00 (2006.01)

(52) U.S. Cl. ............ 348/731; 348/563; 348/569; 725/38; 725/56

(58) Field of Classification Search ........... 348/553, 348/563, 569–570, 725, 731, 732, 734; 725/38, 725/44, 47, 49, 52, 56; G06F 3/00; H04N 5/445
See application file for complete search history.

(56) References Cited

U.S. PATENT DOCUMENTS

| | | | | |
|---|---|---|---|---|
| 5,485,221 A | * | 1/1996 | Banker et al. ............. | 348/563 |
| 5,519,780 A | * | 5/1996 | Woo et al. ................. | 725/137 |
| 5,914,746 A | * | 6/1999 | Matthews et al. ......... | 725/132 |
| 6,133,910 A | * | 10/2000 | Stinebruner ................ | 725/49 |
| 6,137,539 A | * | 10/2000 | Lownes et al. ............. | 348/569 |
| 6,137,546 A | * | 10/2000 | Shintani et al. ............ | 348/731 |
| 6,249,320 B1 | * | 6/2001 | Schneidewend et al. ..... | 348/569 |
| 6,352,592 B1 | * | 3/2002 | Bartholomew et al. ...... | 118/719 |
| 6,369,861 B1 | * | 4/2002 | Lownes ...................... | 348/731 |
| 6,601,237 B1 | * | 7/2003 | Ten Kate et al. ............ | 725/47 |
| 6,621,528 B1 | * | 9/2003 | Kessler et al. ............. | 348/734 |
| 6,661,472 B2 | * | 12/2003 | Shintani et al. ............ | 348/732 |
| 6,714,264 B1 | * | 3/2004 | Kempisty .................... | 348/732 |
| 6,775,843 B1 | * | 8/2004 | McDermott ................ | 725/151 |
| 7,030,933 B2 | * | 4/2006 | Takagi et al. ............... | 348/569 |
| 7,050,117 B2 | * | 5/2006 | Takagi et al. ............... | 348/725 |
| 7,051,359 B2 | * | 5/2006 | Kim et al. ................... | 725/131 |
| 2001/0006404 A1 | * | 7/2001 | Yun ............................ | 348/553 |

(Continued)

FOREIGN PATENT DOCUMENTS

JP 2000-101939 4/2000

OTHER PUBLICATIONS

Patent Abstracts of Japan, Publication No. 2000-101939, Publication Date Apr. 7, 2000, 2 pages.

*Primary Examiner*—Brian P. Yenke
(74) *Attorney, Agent, or Firm*—Osha Liang LLP

(57) ABSTRACT

In a receiver, when a channel is registered on the channel map 15, the receiver 1 registers the channel by the unit of a physical channel, and when a channel is deleted from the channel map 15, the receiver 1 deletes the channel by the unit of a sub-channel. A common user has a tendency of watching most of a plurality of sub-channels contained in one physical channel and a tendency of not watching a portion of the plurality of sub-channels which the user does not like.

11 Claims, 4 Drawing Sheets

U.S. PATENT DOCUMENTS

| | | |
|---|---|---|
| 2002/0116713 A1* | 8/2002 | Mukai et al. .................. 725/58 |
| 2003/0067554 A1* | 4/2003 | Klarfeld et al. ............. 348/461 |
| 2003/0093792 A1* | 5/2003 | Labeeb et al. ................ 725/46 |
| 2003/0121041 A1* | 6/2003 | Mineyama ................... 725/46 |
| 2003/0133050 A1* | 7/2003 | Shintani et al. ............. 348/734 |
| 2004/0049782 A1* | 3/2004 | Shintani et al. ................ 725/38 |
| 2004/0080672 A1* | 4/2004 | Kessler et al. ............... 348/553 |
| 2004/0163108 A1* | 8/2004 | Takagi et al. ................. 725/38 |
| 2004/0250290 A1* | 12/2004 | Kim ........................... 725/126 |
| 2004/0268412 A1* | 12/2004 | Kim ........................... 725/126 |

* cited by examiner

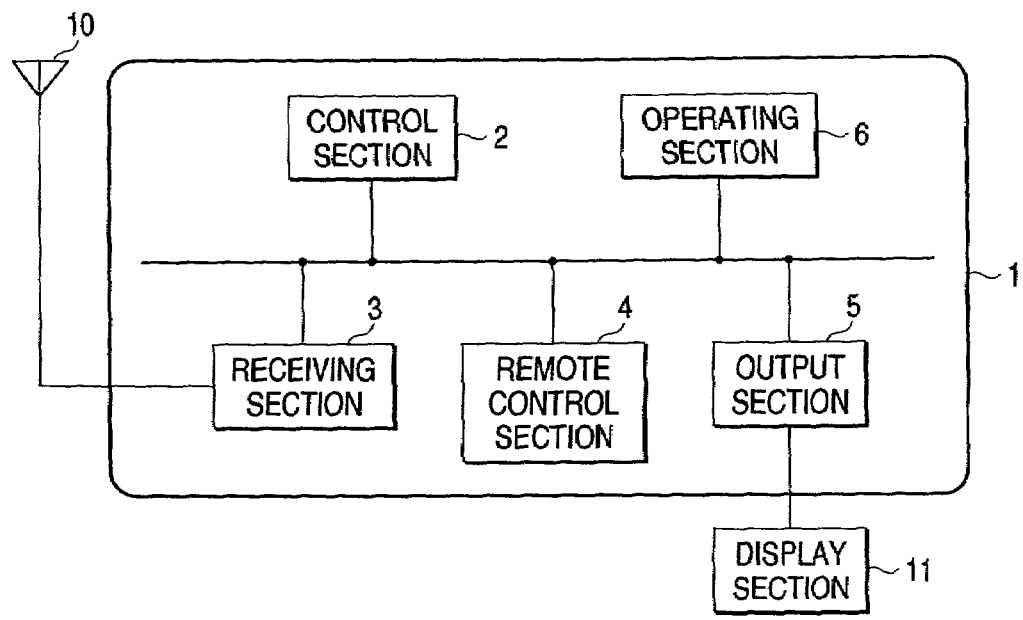

FIG. 5A

| PHYSICAL CHANNEL NUMBER | VIRTUAL CHANNEL NUMBER | | | | | | | | | ANALOG/DIGITAL | |
|---|---|---|---|---|---|---|---|---|---|---|---|
| | MAIN CHANNEL | SUB-CHANNEL | | | | | | | | ANALOG IDENTIFIER | DIGITAL IDENTIFIER |
| | | 0 | 1 | 2 | 3 | 4 | 5 | ...... | 99 | | |
| 1 | | | | | | | | ...... | | | |
| 2 | | | | | | | | ...... | | ○ | |
| 3 | | | | | | | | ...... | | | |
| 4 | 18 | | ○ | ○ | ○ | ○ | | ...... | | | ○ |
| 5 | | | | | | | | ...... | | | |
| 6 | 6 | | | ○ | ○ | | | ...... | | | ○ |
| 7 | | | | | | | | ...... | | | |
| 8 | 2 | ○ | ○ | ○ | ○ | | | ...... | | | ○ |
| 9 | | | | | | | | ...... | | | |
| ⋮ | ⋮ | ⋮ | ⋮ | ⋮ | ⋮ | ⋮ | ⋮ | ⋮ | ⋮ | ⋮ | ⋮ |
| 125 | | | | | | | | ...... | | | |

FIG. 5B

| PHYSICAL CHANNEL NUMBER | VIRTUAL CHANNEL NUMBER | | | | | | | | | ANALOG/DIGITAL | |
|---|---|---|---|---|---|---|---|---|---|---|---|
| | MAIN CHANNEL | SUB-CHANNEL | | | | | | | | ANALOG IDENTIFIER | DIGITAL IDENTIFIER |
| | | 0 | 1 | 2 | 3 | 4 | 5 | ...... | 99 | | |
| 1 | | | | | | | | ...... | | | |
| 2 | | | | | | | | ...... | | ○ | |
| 3 | | | | | | | | ...... | | | |
| 4 | 18 | | ○ | | | | | ...... | | | ○ |
| 5 | | | | | | | | ...... | | | |
| 6 | 6 | | | | | | | ...... | | | ○ |
| 7 | | | | | | | | ...... | | | |
| 8 | 2 | | | | | | | ...... | | | ○ |
| 9 | | | | | | | | ...... | | | |
| ⋮ | ⋮ | ⋮ | ⋮ | ⋮ | ⋮ | ⋮ | ⋮ | ⋮ | ⋮ | ⋮ | ⋮ |
| 125 | | | | | | | | ...... | | | |

RECEIVER

BACKGROUND OF THE INVENTION

1. Field of the Invention

The present invention relates to a receiver applied to a television set for receiving a digital broadcast.

2. Description of the Related Art

Conventionally, television broadcasting has been conducted by means of analog broadcasting. In analog broadcasting, one program is broadcast by only one physical channel. In this case, the physical channel is defined as a frequency band of carrier waves used for broadcasting a program. By a receiver (for example, a television set) of analog broadcasting, a channel to be received is switched by switching a frequency to be received.

In the conventional receiver, there is provided a channel-up/channel-down function by which a channel, in which a program is being broadcast, is successively switched in the order of increasing or decreasing the channel number so that a user can easily tune in to the program. In this case, the channel-up/channel-down function operates as follows. A channel in which a program is being broadcast is previously detected with respect to all frequency bands capable of being received. According to a channel map on which the channel, in which it is detected that the program is being broadcast, is registered, the channel in which the program is being broadcast (the channel registered on the channel map) is successively switched in the order of increasing or decreasing the channel number.

In a common receiver, there is provided a function of scanning an overall region by which a channel, in which a program is being broadcast, is automatically detected and registered on a channel map with respect to all frequency region capable of being received. Also, there is provided a function (one of OSD (On Screen Display) functions) of registering onto and deleting from the channel map by the unit of a physical channel. When the above OSD function is utilized, it is possible for a user to register only his favorite channels on the channel map and tune in to only his favorite channels by using the channel-up/channel-down function. There is proposed a channel preset device by which tuning can be easily conducted in the multiple channel broadcast (Japanese Unexamined Patent Publication No. 2000-101939).

Recently, digital broadcasting, in which a plurality of programs can be broadcast by one physical channel, for example, digital broadcasting by Advanced Television Standards Committee System (ATSC system) has started. In digital broadcasting, a plurality of multiplex virtual channels are formed in a physical channel, and a program is broadcast for each virtual channel. That is, in the case of digital broadcasting, it is possible to broadcast a plurality of programs by one physical channel. Concerning the receiver of digital broadcasting, it is proposed to provide the above channel-up/channel-down function so that a program can be easily selected.

In this connection, in the case of digital broadcasting, a plurality of programs are broadcast by one physical channel. Accordingly, there are provided two channel numbers. One is a physical channel number showing a physical channel, and the other is a virtual channel number showing a multiplex virtual channel. The virtual channel number includes a main channel and sub-channel. A receiving channel is selected in the virtual channel (main channel and subchannel).

However, on the channel map applied to the conventional receiver, registration and deletion are conducted by the unit of a physical channel. Therefore, the following problems may be encountered. In the case of digital broadcasting in which a plurality of programs are broadcast in one physical channel, a channel (sub-channel), in which a program a user does not like is being broadcast, is registered. On the contrary, when a channel (sub-channel), in which a program a user does not like is being broadcast, is deleted, a channel (subchannel), in which a program the user likes is deleted. Accordingly, it is impossible for the user to register only programs he likes on the channel map. Therefore, it is impossible for the user to tune in to his favorite channel by the channel-up/channel-down function.

SUMMARY OF THE INVENTION

An object of the present invention is to provide a receiver, the operation property of which is enhanced, in which a user can tune in to his favorite channel by the channel-up/channel-down function when a channel is registered on the channel map by the unit of a physical channel and a channel is deleted from the channel map by the unit of a sub-channel.

A receiver of the present invention is provided with the following constitution to solve the above problems.

A receiver for receiving a digital broadcast comprises: a channel-up/channel-down means for switching a receiving channel in the order of increasing or decreasing a channel registered on a channel map; a channel registration means for registering a channel on the channel map; and a channel deletion means for deleting a channel registered on the channel map, wherein the channel registration means is a means for registering a sub-channel by the unit of a physical channel, and the channel deletion means is a means for deleting a subchannel registered by the unit of a sub-channel.

In this constitution, when a channel is registered on the channel map, registration can be conducted by the unit of a physical channel. When a channel is deleted from the channel map, deletion can be conducted by the unit of a sub-channel.

A common user watches most of a plurality of sub-channels contained in one physical channel and does not watch some sub-channels in which programs he does not like are being broadcast. Accordingly, in order for the user to register only his favorite channels on the channel map, it is necessary for the user to register most of a plurality of sub-channels contained in one physical channel and not register some sub-channels, which are broadcasting programs he does not like, on the channel map.

Concerning the sub-channels in which programs the user does not like are being broadcast, it is possible to delete only these sub-channels from the channel map. Accordingly, it is possible to reduce labor necessary for the registration of channels onto the channel map. Further, it is possible to register only user's favorite channels on the channel map.

A receiver for receiving a digital broadcast comprises: a channel-up/channel-down means for switching a receiving channel in the order of increasing or decreasing a channel registered on a channel map, the channel map including a registration channel map for registering a sub-channel in which a program is being broadcast, the channel map further including a skip channel map for registering a sub-channel to be skipped when a receiving channel is switched by the channel-up/channel-down means.

In this constitution, there are provided a registration channel map and skip channel map. On the registration channel map, a sub-channel in which a program is being broadcast is registered. On the skip channel map, a sub-channel is registered which is skipped when a receiving channel is switched by the channel-up/channel-down means. Due to the foregoing, it is possible to comply with a dynamic change in the number of sub-channels in digital broadcasting. Specifically, in order to comply with a dynamic change in the number of subchannels, it is proposed to automatically renew the channel map for registration. In this automatic renewal processing, information of the sub-channel (channel map for skipping), which is skipped in the case of switching a receiving channel conducted by the channel-up/channel-down means by the user, is not rewritten. Accordingly, there is no possibility that tuning is conducted into a sub-channel which is set so that it can be skipped when a receiving channel is switched by the channel-up/channel-down means.

A receiver further comprises a channel registration means for registering a sub-channel on the registration channel map by the unit of a physical channel.

A receiver further comprises a skip channel registration means for registering a sub-channel to be skipped on the skip channel map by the unit of a sub-channel.

BRIEF DESCRIPTION OF THE DRAWINGS

FIG. 1 is a block diagram showing an arrangement of an embodiment of the present invention.

FIG. 2 is a view showing a channel map in a receiver of an embodiment of the present invention.

FIGS. 5A and 5B are views showing a channel map in a receiver of another embodiment of the present invention.

DETAILED DESCRIPTION OF THE PREFERRED EMBODIMENTS

Figure 3:
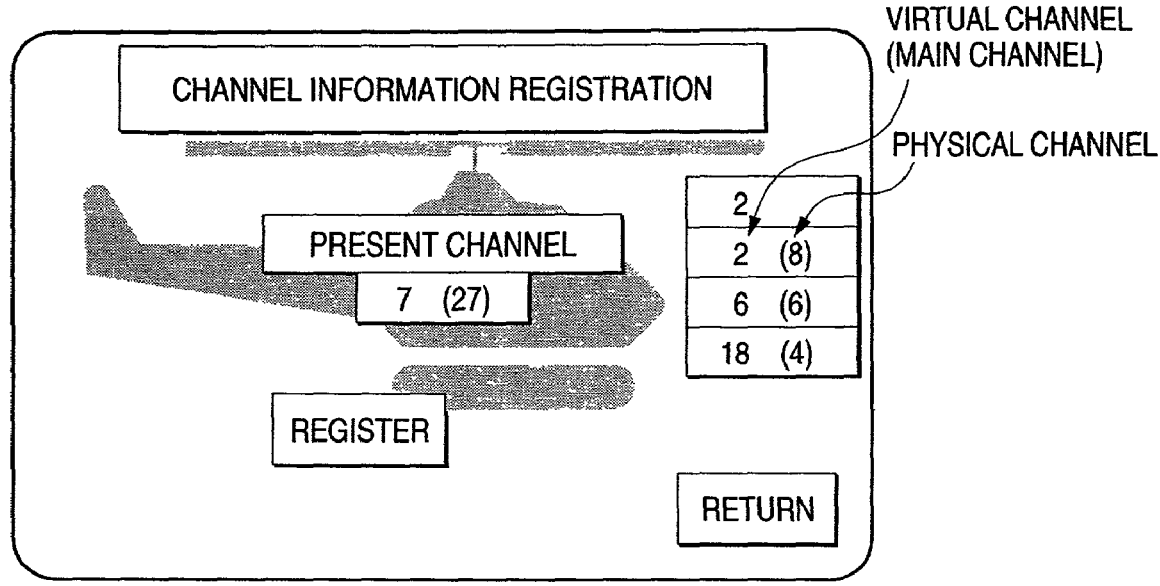
FIG. 3 is a view showing an example of a display image plane in the case of registering a channel map by OSD menu in a receiver of an embodiment of the present invention.

Now, a description will be given in more detail of preferred embodiments of the invention with reference to the accompanying drawings.

FIG. 1 is a block diagram showing an arrangement of a receiver which is an embodiment of the present invention. The receiver 1 of this embodiment is a receiver used for receiving digital broadcasting of ATSC (Advanced Television Standards Committee) system. The control section 2 controls a motion of the receiver body 1. The receiving section 3 picks up signals of a program, which is being broadcast in a channel, selected from digital and analog signals received by the antenna 10. The remote control receiving section 4 receives a control signal sent from a remote control unit not shown by infrared rays or electric waves, for example, the remote control receiving section 4 receives a channel switching signal. The output section 5 outputs an image signal and a voice signal decoded by the receiving section 3. The display section 11 displays an image according to the image signal outputted from the output section 5. At the same time, the display section 11 outputs a voice according to the voice signal. The operating section 6 is provided with keys operated when the channel is switched.

As well known, in digital broadcasting, it is possible to form a plurality of multiplex virtual channels in the physical channel, and it is also possible to broadcast a program for each virtual channel. That is, it is possible to broadcast a plurality of programs in one physical channel (frequency band).

In this case, the physical channel is defined as a frequency band of carrier waves used for broadcasting a program.

Therefore, in digital broadcasting, there are provided two channel numbers, one is a channel number corresponding to the physical channel (referred to as a physical channel number hereinafter) and the other is a channel number corresponding to the virtual channel (referred to as a virtual channel number hereinafter). The virtual channel number includes a main channel and subchannel. When the channel number is switched, the number is indicated by the virtual channel number (main channel and sub-channel).

The control section 2 stores the following channel map 15 in a non-volatile memory (not shown). The capacity of this channel map is 2 to 3 kbyte. FIG. 2 is a view showing a channel map stored in the receiver 1 of this embodiment. The channel map 15 is composed of 125 regions, and each region is allotted to one physical channel. Each region includes: a physical channel number; a virtual channel number (main channel and sub-channel); and a region in which either digital broadcasting or analog broadcasting is recorded (region in which a digital identifier and analog identifier are recorded). Main channel number are recorded by numerals. Sub-channel numbers are recorded by 100 flags. Specifically, in each of the sub-channel numbers 0 to 99, there is provided a region in which a flag is recorded. In each region, a flag is recorded which shows whether or not a program is being broadcast. Further, the channel map 15 records a flag (digital identifier and analog identifier) showing whether a physical channel, in which a program is being broadcast, is a digital broadcast or an analog broadcast.

Since it is impossible for an analog broadcast to transmit a virtual channel number, a region of the virtual channel number allotted to a physical channel of the analog broadcast is made to be blank (physical channel number 2 shown in FIG. 2). Concerning the physical channel in which no programs are being broadcast, both the virtual channel region and the analog/digital identifier region are made to be blank (physical channel numbers 1, 3, 5, 7 and 9 shown in FIG. 2). Since it is impossible for a digital broadcasting signal having no VCT to transmit a virtual channel number, a physical channel number is used for a main channel number of the virtual channel, and a program number is used for a sub-channel number (physical channel number 6 shown in FIG. 2).

Further, FIG. 2 shows an example in which an analog broadcasting signal is used for the physical channel number 2 and a channel of the physical channel number 8 uses the virtual channel number 2.

This example is provided for handling a conventional analog broadcast and a new digital broadcast as one united channel. This is a form recommended by ATSC Standards. In this case, a user recognizes these broadcasting signals as one united channel having the main channel number 2.

In this connection, in the channel, the physical channel number of which is 8, a flag is raised at the sub-channel number 0. However, it does not means that a broadcasting signal of the program is contained in the physical channel 8. It is stipulated that the sub-channel number 0 must not be attached to a program of digital broadcasting. This flag shows that the other pieces of channel information such as a channel name of an analog broadcast, the physical channel number of which is 2, are transmitted by the broadcasting signal of the physical channel number 8.

Explanations will be made into a channel registration to and channel deletion from the channel map 15 by OSD (On Screen Display) menu in the receiver 1 of this embodiment. A user selects a registration menu with the operating section 6 or a remote control unit (not shown). After the registration menu has been selected, the registration image plane shown in FIG. 3 is displayed in the display section 11. On this registration image plane, the channels (main channel and physical channel), which have already been registered on the channel map 15, are displayed, and at the center of the image plane, the present channel (main channel and physical channel) is displayed.

When the user conducts operation to indicate a registration at this time, the channel displayed at the center on the image plane is registered on the channel map by the unit of a physical channel. That is, all the sub-channels, which are being broadcast in this physical channel, are registered on the channel map 15.

As described above, a registration of the channel onto the channel map 15 by OSD menu can be conducted by the unit of a physical channel.

Figure 4:
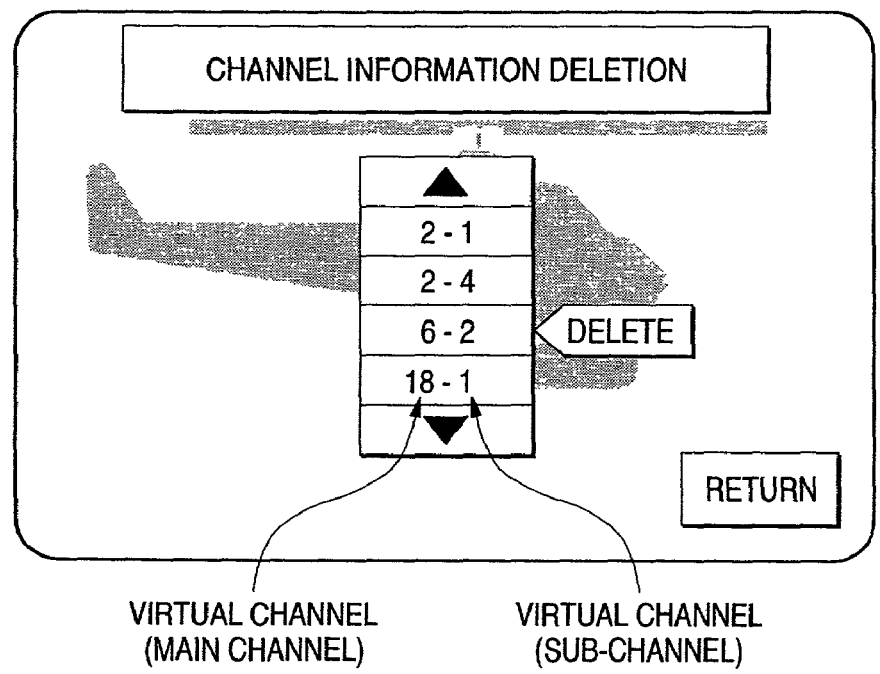
FIG. 4 is a view showing an example of a display image plane in the case of deleting a channel map by OSD menu in a receiver of an embodiment of the present invention.

Next, explanations will be made into a deletion of the channel, which is registered onto the channel map 15, conducted by OSD menu. The user selects a deletion menu with the operating section 6 or a remote control unit (not shown). After the deletion menu has been selected, the deletion image plane shown in FIG. 4 is displayed in the display section 11. On this deletion image plane, the channel registered on the channel map 15 is displayed by the unit of a sub-channel. The user can indicate to delete an arbitrary sub-channel shown on the image plane. When the user indicates to delete a sub-channel, the receiver 1 lays down a corresponding flag so that the indicated sub-channel can be deleted from the channel map 15.

As described above, a deletion of the channel, which is registered on the channel map 15, conducted by OSD menu is made by the unit of a sub-channel.

As described above, in the receiver 1 of this embodiment, the registration of the channel onto the channel map 15 is conducted by the unit of a physical channel, and the channel registered onto the channel map 15 is deleted by the unit of a sub-channel. A common user has a tendency of watching most of a plurality of sub-channels contained in one physical channel and a tendency of not watching a portion of the plurality of sub-channels. Accordingly, when the registration onto the channel map 15 is conducted by the unit of a physical channel and the deletion from the channel map 15 is conducted by the unit of a sub-channel, it is possible to reduce labor necessary for registering the channel onto the channel map 15 and also it is possible to register only a favorite channel of the user onto the channel map 15. Due to the foregoing, there is no possibility of the occurrence of such a problem that a channel, which the user does not like, is tuned in or a channel, which the user likes, is not tuned in.

Next, explanations will be made into the receiver 1 of another embodiment of the present invention. The receiver 1 of this embodiment is provided with the channel map 21 for registration shown in FIG. 5A and the channel map 22 for skip shown in FIG. 5B. The channel map 21 for registration and channel map 22 for skip are composed in the same manner as that of the channel map 15 of the above embodiment. However, the use is different as described below.

In the receiver 1 of this embodiment, the channel registration onto the channel map 21 for registration can be conducted by the unit of a physical channel when the same operation as that of the above embodiment is carried out. However, different from the embodiment described above, it is impossible to delete a channel registered onto the channel map 21 for registration. In the receiver 1 of this embodiment, when a channel is deleted by OSD menu explained in the above embodiment, a sub-channel, which is indicated to be deleted, is registered onto the channel map 22 for skip.

As described above, in the receiver 1 of this embodiment, a channel is registered onto the channel map 21 for registration by the unit of a physical channel, and a channel, which is skipped when a channel is switched by the channel-up/channel-down function, is registered on the channel map 22 for skip by the unit of a sub-channel. (Deletion is not conducted on the channel map 21 for registration.)

Further, the receiver 1 of this embodiment is provided with a function of automatically renewing the channel map 21 for registration described below. Especially, since the sub-channel is dynamically changing in digital broadcasting, unless the channel map (channel map 21 for registration in this case) is periodically renewed, there is a high possibility that a channel (sub-channel), in which a program is not being broadcast, is tuned in by the channel-up/channel-down function.

Figure 6:
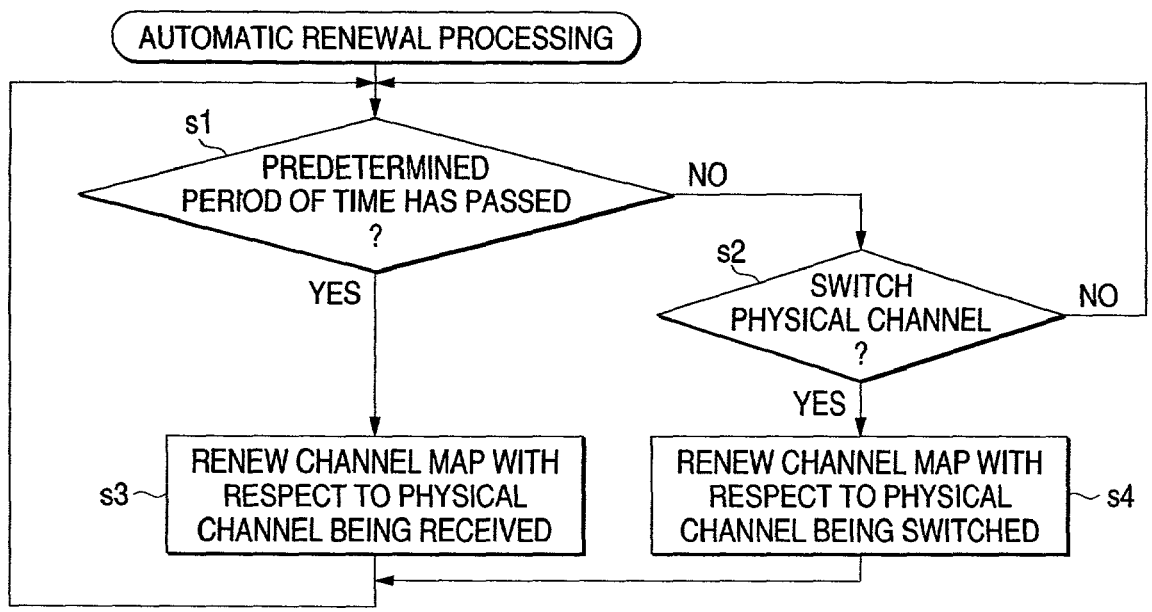
FIG. 6 is a flow chart showing an automatic renewal processing of a channel map for registration in a receiver of another embodiment of the present invention.

Explanations will be made into an automatic renewal processing of the channel map 21 for registration in the receiver 1 of this embodiment. FIG. 6 is a flow chart showing an automatic renewal processing of the channel map for registration. The receiver 1 waits for the successive operation until a predetermined period of time passes through or a physical channel is switched (s1, s2). In this case, the predetermined period of time is a period of time which has lapsed away from the last renewal. When it is judged in s1 that the predetermined period of time has lapsed away, VCT is received with respect to the physical channel which is being received, and the channel map 21 for registration is renewed according to the received VTC (s3). When it is judged in s2 that the physical channel has been switched, VCT is received with respect to the switched physical channel, and the channel map 21 for registration is renewed according to the received VCT (s4). Due to the foregoing, it is possible to provide a channel map 21 for registration corresponding to a dynamic change in the virtual channel on digital broadcasting. In this connection, in this automatic renewal processing, a content of the channel map 22 for skip is not rewritten.

Figure 7:
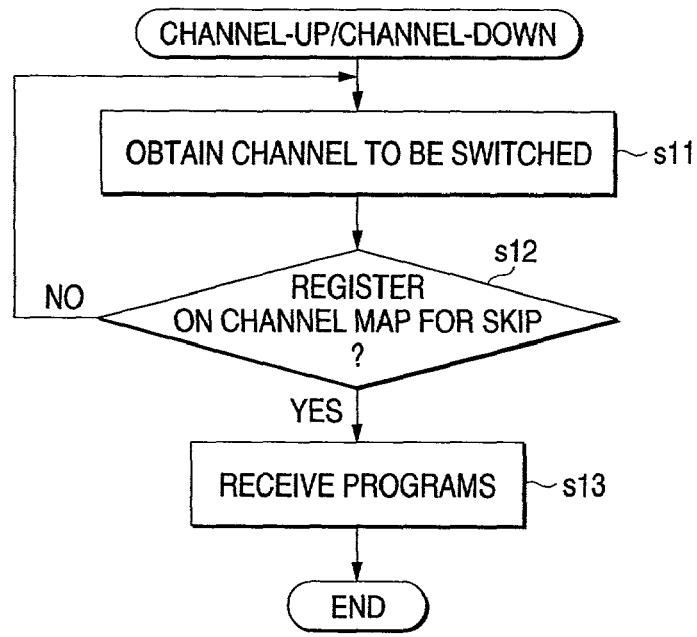
FIG. 7 is a flow chart showing a channel-up/channel-down processing in a receiver of another embodiment of the present invention.

Next, a channel switching motion conducted by the channel-up/channel-down function in the receiver 1 of this embodiment will be explained as follows. FIG. 7 is a flow chart showing this processing. When the channel-up/channel-down operation is conducted, the receiver 1 refers to the channel map 21 for registration and obtains a channel to be switched (s11). The channel obtained in s11 is a channel in which programs are being broadcast (channel registered on the channel map 21 for registration), that is, the channel obtained in s11 is a channel, the channel number of which is larger than that of the program, which is being broadcast now, by one, or which is smaller than that of the program, which is being broadcast now, by one.

When a channel to be switched is obtained in s1, the receiver 1 judges whether or not the channel is registered on the channel map 22 for skip (s12).

As described above, on the channel map 22 for skip, channels, the watch of which is restricted because the user does not like to watch the channels, are registered. When the channel obtained in s11 is registered on the channel map 22 for skip, the receiver 1 returns to s11 and obtains a channel, in which programs are being broadcast, the channel number of which is larger by one than that of the channel which is obtained before so as to be switched, or the channel number of which is smaller by one than that of the channel which is obtained before so as to be switched.

When it is judged in s12 that the channel obtained in s11 is not registered on the channel map 22 for skip, the receiver 1 receives a program which is being broadcast in this channel (s13).

As described above, the receiver 1 of this embodiment includes: a channel map 21 for registration which is used for registering a channel in which a program is being broadcast; and a channel map 22 for skip on which a channel to be skipped in the case of switching a channel by the channel-up/channel-down function is registered by the unit of a sub-channel. Accordingly, there is no possibility that a channel (sub-channel) in which a program is not being broadcast is tuned in by the channel-up/channel-down function. Therefore, the operation property can be enhanced.

As described above, according to the present invention, a channel can be registered onto a channel map by the unit of a physical channel, and further a channel can be deleted from the channel map by the unit of a sub-channel. Accordingly, it is possible to reduce labor when a channel is registered onto the channel map. Further, it is possible for a user to register his favorite channel onto the channel map.

According to the present invention, a sub-channel, in which a program is being broadcast, is registered onto a channel map for registration, and a subchannel, which is skipped in the case of switching a receiving channel by the channel-up/channel-down means, is registered on a channel map for skip. Accordingly, there is no possibility that a channel (sub-channel), in which a program is not being broadcast, is tuned in by the channel-up/channel-down function. Therefore, the operation property can be enhanced.

What is claimed is:

1. A receiver for receiving a digital broadcast, comprising:
  a channel-up/channel-down means for switching received virtual channels in increasing or decreasing order;
  a channel map comprising:
    a registration channel map for registering received sub-channels; and
    a skip channel map for registering a subset of the received sub-channels to be skipped, wherein a virtual channel corresponding to a sub-channel in the subset of the received sub-channels is skipped when the corresponding received virtual channel is switched to by the channel-up/channel-down means;
  a channel registration means for registering a received sub-channel on the registration channel map by the unit of a physical channel, wherein all received sub-channels for a given physical channel are registered on the registration channel map; and
  a skip channel registration means for registering a received sub-channel to be skipped on the skip channel map by the unit of a sub-channel, wherein only sub-channels designated to be skipped are registered on the skip channel map,
  wherein a sub-channel to be skipped is selected independently of a physical channel corresponding to the sub-channel.

2. A receiver for receiving a digital broadcasts, comprising:
  a channel-up/channel-down means for switching a received virtual channel in increasing or decreasing order;
  a channel registration means for registering a received sub-channel on the channel map; and
  a channel deletion means for deleting a received sub-channel registered on the channel map,
  wherein the channel registration means registers a sub-channel from the channel map by the unit of a physical channel,
  wherein all received sub-channels for a given physical channel are initially registered on the channel registration means:
  wherein the channel deletion means deletes selected sub-channels from the channel map by the unit of a sub-channel after all received sub-channels are initially registered, and
  wherein sub-channel to be deleted is selected independently of a physical channel corresponding to the sub-channel.

3. The receiver of claim 2, wherein a physical channel comprises a main channel and one or more sub-channels.

4. The receiver of claim 2, wherein a sub-channel corresponds to a single physical channel.

5. The receiver of claim 2, wherein a virtual channel comprises a main channel and a sub-channel.

6. A receiver for receiving a digital broadcast comprising:
  a channel-up/channel-down means for switching received virtual channels in increasing or decreasing order;
  a channel map comprising:
    a registration channel map for registering received sub-channel;
    a skip channel map for registering a subset of the received sub-channels to be skipped, wherein a sub-channel in the subset of the received sub-channels is skipped when a corresponding received virtual channel is switched to by the channel-up/channel-down means;
  wherein a sub-channel to be skipped is previously selected by a user, independently of a physical channel corresponding to the sub-channel.

7. The receiver of claim 6, further comprising a channel registration means for registering a received sub-channel on the registration channel map by the unit of a physical channel, wherein all received sub-channels for a given physical channel are registered on the channel registration means.

8. The receiver of claim 6, further comprising a skip channel registration means for registering a received sub-channel to be skipped on the skip channel map by the unit of a sub-channel, wherein only sub-channels designated to be skipped are registered on the skip channel map.

9. The receiver of claim 6, wherein a physical channel comprises a main channel and one or more sub-channels.

10. The receiver of claim 6, wherein a sub-channel corresponds to a single physical channel.

11. The receiver of claim 6, wherein a virtual channel comprises a main channel and a sub-channel.

* * * * *